United States Patent
Dappen

(10) Patent No.: US 9,000,336 B2
(45) Date of Patent: Apr. 7, 2015

(54) DEVICE FOR HARDENING A CYLINDRICAL SECTION OF A WORKPIECE AND USE OF SUCH A DEVICE

(75) Inventor: Stefan Dappen, Aachen (DE)

(73) Assignee: SMS Elotherm GmbH, Remscheid (DE)

( * ) Notice: Subject to any disclaimer, the term of this patent is extended or adjusted under 35 U.S.C. 154(b) by 566 days.

(21) Appl. No.: 12/899,822

(22) Filed: Oct. 7, 2010

(65) Prior Publication Data

US 2011/0089164 A1 Apr. 21, 2011

(30) Foreign Application Priority Data

Oct. 8, 2009 (DE) .......................... 10 2009 048 768

(51) Int. Cl.
| | | |
|---|---|---|
| H05B 6/10 | (2006.01) | |
| H05B 6/36 | (2006.01) | |
| C21D 9/30 | (2006.01) | |
| C21D 1/10 | (2006.01) | |

(52) U.S. Cl.
CPC .. *C21D 9/30* (2013.01); *H05B 6/10* (2013.01); *C21D 1/10* (2013.01)

(58) Field of Classification Search
CPC .............. C21D 9/28; C21D 9/30; C21D 1/10; C21D 2221/00; C21D 2221/02; C21D 2221/10; H05B 6/40; H05B 6/42; H05B 6/101; H05B 6/362; H05B 6/36; H05B 6/38; H05B 6/44; H05B 6/10
USPC ......... 219/635, 637, 638, 639, 640, 641, 652, 219/671, 676, 677, 650, 670, 672; 266/129, 266/249; 148/572, 573, 567
See application file for complete search history.

(56) References Cited

U.S. PATENT DOCUMENTS

| | | | |
|---|---|---|---|
| 6,399,928 B1 | 6/2002 | Gezarzick et al. | |
| 6,638,379 B1 * | 10/2003 | Schulte et al. | 219/639 |
| 2006/0027569 A1 | 2/2006 | Zahn et al. | |
| 2008/0041844 A1 * | 2/2008 | Akers et al. | 219/639 |

FOREIGN PATENT DOCUMENTS

| | | |
|---|---|---|
| DE | 814162 C | 9/1951 |
| DE | 3623119 C1 | 5/1987 |
| DE | 19808763 C1 | 4/1999 |
| EP | 1624077 A2 | 2/2006 |
| JP | 2000-45028 A * | 2/2000 |

* cited by examiner

Primary Examiner — Henry Yuen
Assistant Examiner — Hung D Nguyen
(74) Attorney, Agent, or Firm — The Webb Law Firm

(57) ABSTRACT

A device for hardening the surface of a workpiece, wherein an energy supply part and a working part each include a magnetic core, wherein the magnetic cores are at a small distance from each other such that electrical energy is transmitted contactlessly from the energy supply part of the inductor to the working part of the inductor, and wherein the working part includes a heating conductor branch for inductive heating of a section of the surface of the workpiece; a control instrument coupled to the inductor, wherein the control instrument displaces the working part relative to the surface to be hardened and relative to the energy supply part, and wherein the magnetic core of the working part is displaced relative to the magnetic core of the energy supply part; and an electrical energy supply connected to the energy supply part of the inductor.

7 Claims, 4 Drawing Sheets

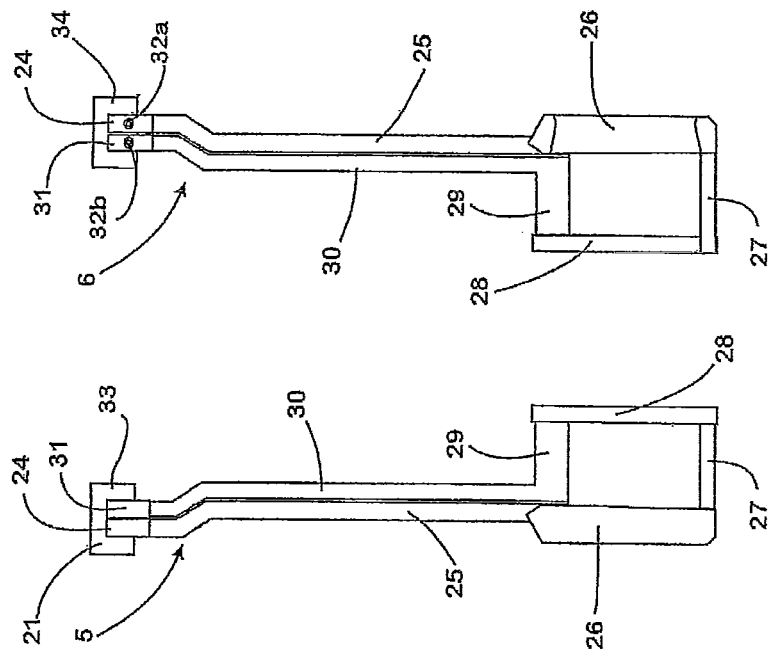
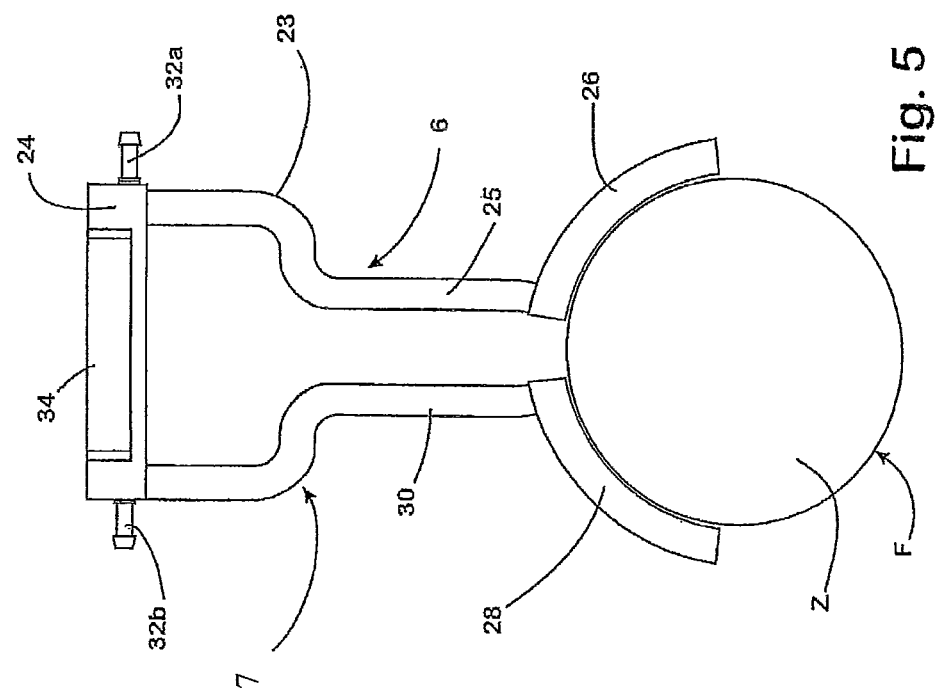
Fig. 5
Fig. 6
Fig. 7

DEVICE FOR HARDENING A CYLINDRICAL SECTION OF A WORKPIECE AND USE OF SUCH A DEVICE

The invention relates to a device for hardening the surface of a cylindrical section of a workpiece, in which an undercut incised into the workpiece part in the axial direction of the workpiece is formed in the transition region between the cylindrical section and an adjacent workpiece part. The device comprises an inductor which has a heating conductor branch extending in the circumferential direction of the surface to be hardened for inductive heating of the relevant section, a control instrument for pressing the heating conductor branch into the undercut and an energy supply, which supplies the inductor with electrical energy during operation.

Such devices are used in particular to harden the bearing surfaces of crankpins of a crankshaft, in which the crankpins are bounded laterally by faces. In many cases, for such crankshafts or when using comparably loaded workpieces, an undercut is respectively formed in order to avoid loading peaks in the region of the transitions between the bearing surface of the crankpin and the adjacent face.

In order to harden the bearing surface in the region of this undercut as well, an inductor divided into two halves is used in a device known from DE 36 23 119 C1 for inductive heating of the bearing position to be hardened. One of the inductor halves is firmly connected to a control unit, while the second inductor half is fastened tiltably to the stationary inductor half. The control unit comprises a first instrument for placing the inductor onto the bearing position to be hardened, a second control instrument for moving the inductor axially parallel to the longitudinal axis of the shaft, and a third control instrument for tilting the tiltable inductor half into its working position. In this way, the halves of the inductor can be placed together onto the bearing surface to be hardened in positions lying close to one another with the aid of the control unit, until the heating conductor branches of the inductor rest on the bearing surface. Subsequently, the stationary inductor half is first brought into its working position by moving it axially parallel to the longitudinal axis of the shaft together with the tiltable inductor half. Next, the tiltable inductor half is tilted in the direction of the undercut assigned to it.

This comparably simple way of positioning the inductor has the problem of considerable equipment outlay. It furthermore proves difficult to bring the tiltable inductor half into an optimal working situation, and guide it there so that its unimpaired function is ensured even during continuous operation. This leads to a degraded working outcome. Lastly, both the electrical connection and the coolant supply of the tiltable inductor half have proven susceptible.

In order to further improve the effectiveness when hardening bearing positions of a crankshaft with undercuts, DE 198 08 763 C1 has proposed a device which is equipped with two mutually independent heating units, each of which comprises an inductor and at least the associated electrical power supply instrument. In this way, susceptible terminals of the electrical connections of the inductors and the heating unit respectively assigned to them, as well as the coolant supply, can be obviated. The quenching sprayers optionally also carried by the heating units can furthermore be readily supplied with quenching fluid. The dimensions and the outer shape of the inductors of the two heating units are adapted to one another in the known device so that, depending on the application, a single one of the inductors or both inductors can be placed together and simultaneously onto the shaft to be processed in positions lying close to one another. In this position, the total width of the two inductors, measured in the axial direction of the shaft, is less than the width of the free space which is present between the two shaft parts adjacent to the bearing position to be hardened, so that there is no risk of a collision when the inductors are being introduced into the free space. Owing to the independency of the heating units, it is furthermore readily possible to ensure by the simplest of means, for example by using sliding pads, that the inductors keep to their working position during processing.

These advantages of the device known from DE 198 08 763 C1 are confronted in practice with the disadvantages that large masses respectively need to be moved for the placement and introduction of the inductors. This not only necessitates strong drives, but also restricts the possibility of carrying out the control movements with a speed necessary for rapidly cycled series operation. Furthermore, the need to provide not only separate control instruments but also in each case a separate energy and coolant supply, leads to high production and operating costs.

These problems are no longer supposed to exist in the device known from EP 1 624 077 A2 for hardening the bearing surfaces of a crankshaft provided with undercuts. Like the prior art already explained above, this known device comprises a heating unit which is connected to an electrical power supply and provided with an inductor. As in the prior art, the inductor has two heating conductor arms arranged at a distance from one another and respectively extending in the circumferential direction of the bearing position to be hardened. Each of the two heating conductor arms is provided with an inner running surface hardening branch and two outer radial hardening branches, the running surface hardening branch respectively being connected mechanically to the radial hardening branches by current-carrying members which carry the radial hardening branches. The mechanical connection is resilient so that the radial hardening branches are displaceable relative to the running surface hardening branch in the axial direction of the shaft to be hardened while maintaining the electrical connection. The flexible copper elements used in practice for this purpose are bent up when introducing the radial hardening branches into the respective undercut, and bent back again when extracting them. The effect of this loading is that the resilient electrical connections are fatigued after a comparatively short period of use and their correct function is no longer ensured.

Against this background, the object of the invention was to provide a device of the type mentioned in the introduction, by which an improved working outcome can be achieved with reduced equipment outlay. An advantageous use of such a device is furthermore to be provided.

A device according to the invention for hardening the surface of a cylindrical section of a workpiece, in which an undercut incised into the workpiece part in the axial direction of the workpiece is formed in the transition region between the cylindrical section and an adjacent workpiece part, comprises, in accordance with the prior art discussed in the introduction to the present description, an inductor which comprises a heating conductor branch which extends in the circumferential direction of the surface to be hardened for inductive heating. A device according to the invention furthermore has a control instrument for pressing the heating conductor branch of the inductor into the undercut, and an energy supply which supplies the inductor with electrical energy during operation.

According to the invention, the inductor is now divided into an energy supply part which is connected to the energy supply, and a working part which comprises the heating conductor branch and is coupled to the control instrument which displaces the working part relative to the surface to be hardened and relative to the energy supply part in order to press the heating conductor branch into the undercut.

In order to supply the working part with the electrical energy required for inductive heating of the surface to be hardened, according to the invention a transmission unit is also provided which transmits the electrical energy contactlessly from the energy supply part to the working part of the inductor, and thus supplies the heating conductor branch of the inductor.

The invention is therefore based on the discovery that, with the aid of a contactlessly operating transmission unit, it is still possible to transmit sufficient electrical energy from one part of the inductor, namely the energy supply part coupled to the energy supply, to the working part if the working part is mobile in order to adjust its working position relative to the energy supply part.

This makes it possible on the one hand to bring the working part into its working position by simple movements. This requires neither elaborate control instruments nor special drives or the like. Instead, it is possible to use simple linear drives in order to carry out the movements of the working part which are necessary for introducing the heating conductor branch into the undercut and extracting it therefrom.

On the other hand, the invention makes it possible to fully obviate fixed connections between the energy supply part which is stationary during the hardening operation, and the moved working part of the inductor. This pertains both to the electrical leads and tube connections, via which cooling water is delivered in order to cool the heating conductor branch. The loads in particular on the electrical leads, which are inevitably moved in the prior art by the relative movement between the energy supply and the inductor, which is essential for pressing the inductor into the undercut to be included in the hardening, consequently no longer occur in a device according to the invention. As a result, the risk of material fatigue, breaks of electrical leads or the like no longer exists with devices according to the invention.

Another essential advantage of the invention is that the masses to be moved are reduced to a minimum. In particular, elaborate control instruments are no longer necessary, which have to accomplish the movements of the inductor in order to reach the working position in the undercut region. The control instrument provided for moving the working part merely needs to be configured so that the heating conductor branch is positioned accurately enough with respect to the workpiece. To this end, a mechanical stop may be provided. In the region of the transmitter, on the other hand, it is not necessary to align the two sides of the transmitter accurately with one another, since self-centring by the magnetic forces takes place when the energy is switched on. In comparison with known methods based on the mechanical closure of an electrical contact, significantly lower positioning forces and therefore smaller control elements are consequently required.

A particularly simple configuration of a device according to the invention is obtained when the dividing plane between the working part and the energy supply part is orientated parallel to the longitudinal axis of the workpiece. For a workpiece whose longitudinal axis is horizontally orientated, the dividing plane is therefore likewise in horizontal orientation. It is, however, also possible to orientate the dividing plane perpendicularly to the longitudinal axis of the workpiece. In the case of a horizontally orientated longitudinal axis of the workpiece, this means that the dividing plane may be vertically orientated. It is furthermore conceivable to orientate the dividing plane transversely, in particular normally with respect to the workpiece longitudinal axis.

In principle, the advantages of the invention are already achieved when the workpiece's cylindrical surface to be hardened merges into an undercut only along its one edge. The invention can be used particularly effectively, however, when an undercut is respectively present at the two edges of the surface to be hardened which lie opposite one another in the axial direction of the workpiece. In order to harden a surface formed in this way, the device according to the invention may comprise two working parts, of which one working part is assigned to a first undercut provided on one edge of the surface to be hardened of the workpiece and the other working part is assigned to a second undercut which is provided on the opposite edge from the first edge of the surface to be hardened of the workpiece. The particular advantage of the invention in this context is that both working parts can readily be supplied together with the required electrical energy by means of a single transmission unit. The costs for production and operation of the devices according to the invention are therefore significantly reduced in comparison with the prior art.

According to another practically expedient configuration of the invention, the transmission unit transmits the required electrical energy inductively to the working part. To this end, the transmission unit may be configured as a transformer in which the primary side is part of the energy supply part and the secondary side is part of the working part. Typically, to this end, the conductors of the energy supply part and those of the working part are fed insulated next to one another in close proximity in the region of the transmission unit, in order to achieve a good transmission effect. The conductors are advantageously equipped with magnetically conductive material such as soft magnetic cores or magnetic steel plates in order to achieve better guiding of the magnetic field for the transmission. Depending on the space available, the conductors may in this case optionally be formed with one or more turns both on the energy supply part side and on the working part side.

In the event that heating conductor cooling is required in order to avoid overheating of the heating conductor, the working part may comprise a cooling instrument for cooling the heating conductor branch. The device according to the invention then comprises, in a manner known per se, a coolant supply to which the working part is connected. The heating conductor branch itself may, likewise in a known way, be formed at least locally hollow and flowed through by coolant over its hollow section during operation.

Owing to its low moving masses and the transmission of electrical energy taking place contactlessly according to the invention between the two inductor parts, the device according to the invention is particularly suitable for hardening a bearing position of a shaft, in which an undercut orientated in the axial direction of the shaft is formed at a transition between the bearing position and an adjacent shaft section. The shaft processed in the manner according to the invention is typically a crankshaft for a combustion engine.

The invention will be explained in more detail below with the aid of a drawing which represents exemplary embodiments. In each case schematically:

FIG. 5 shows the working parts of the inductor in a side view;

FIG. 6 shows the inductor's working part assigned to one edge of the bearing surface to be hardened, in a view from the front;

FIG. 7 shows the inductor's working part assigned to the other edge of the bearing surface to be hardened, in a view from the front.

Figure 1:
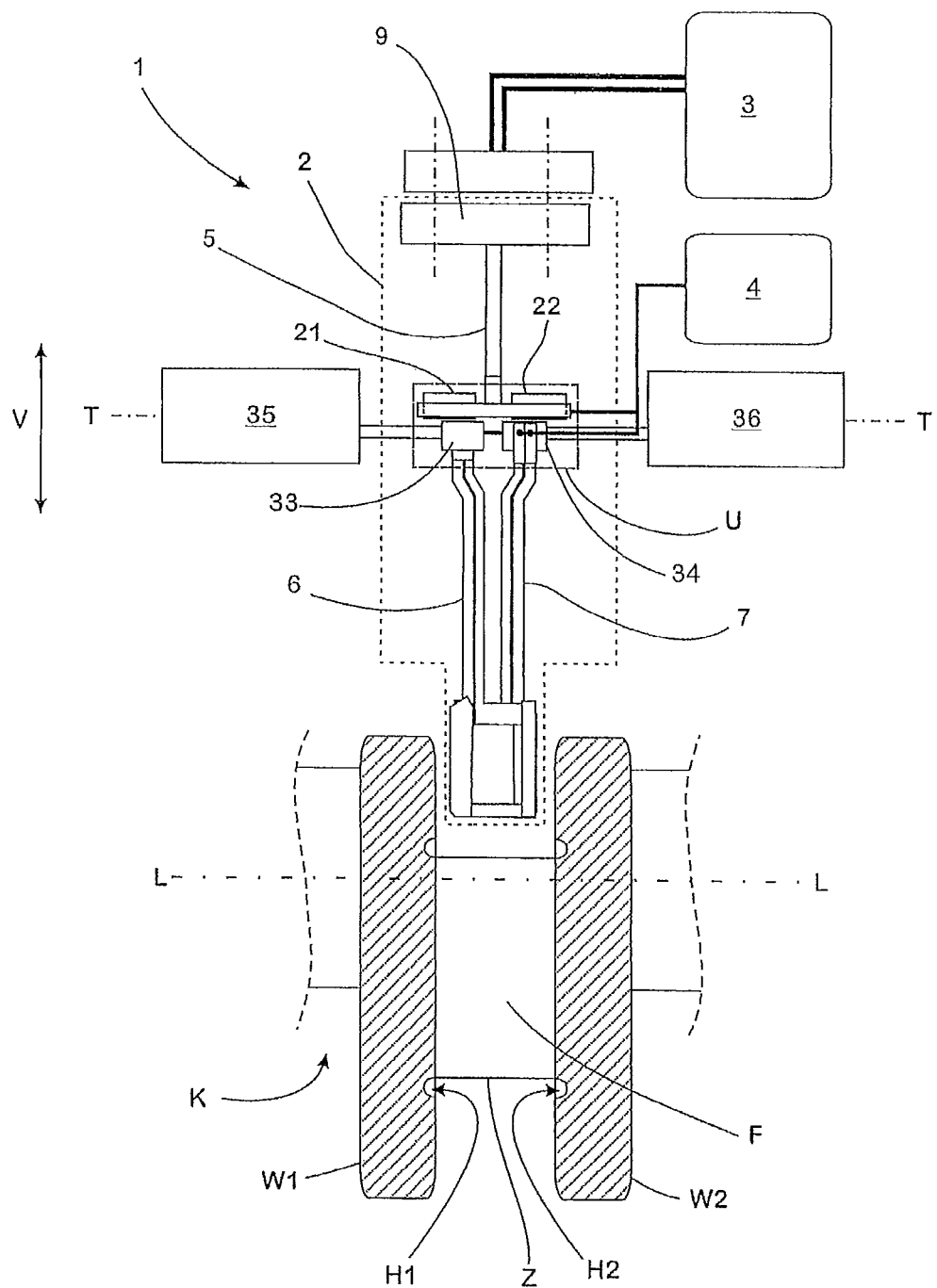
FIG. 1 shows a device for hardening the bearing surface when forwarding the inductor in the direction of the pin in a view from the front.

The device 1 for inductive heating and hardening of the bearing surface F of a crankpin Z of a crankshaft K (not further represented) for a combustion engine comprises an inductor 2, an energy supply 3 conventionally formed by a transformer and inverter, which provides the electrical energy required for operation of the inductor 2, and a coolant supply 4 which delivers coolant for cooling the inductor 2.

The device 1 also has a quenching instrument (not shown here for the sake of clarity), by means of which quenching medium is applied onto the bearing surface F heated to hardening temperature, so as to generate a hard structure there by sufficiently rapid cooling.

The bearing surfaces F of the crankshaft K are respectively bounded at their edges by a crankface W1, W2. In the region of the transition from the respective bearing surface F into its associated side surface of the respective crankfaces W1, W2, an undercut H1, H2 is respectively cut into the crankfaces W1, W2, this undercut extending over a depth of typically –5-10 mm in the direction of the longitudinal axis L of the crankshaft K into the respective face W1, W2.

The inductor 2 is divided in a dividing plane T extending parallel to the longitudinal axis L of the crankshaft K into an energy supply part 5 and two working parts 6, 7. The longitudinal axis L coincides with the rotation axis, about which the crankshaft K rotates during the hardening treatment of the bearing surface F of the crankpin Z which is arranged off-centre in relation to the longitudinal axis L.

The energy supply part 5 is carried by a control instrument (not represented here) formed in a manner known per se, which forwards the inductor 2 with its energy supply part 5 and its working parts 6, 7 in the vertical direction V onto the bearing surface F respectively to be hardened, and adjusts it during the hardening treatment of the movement of the pin Z.

Figure 4:
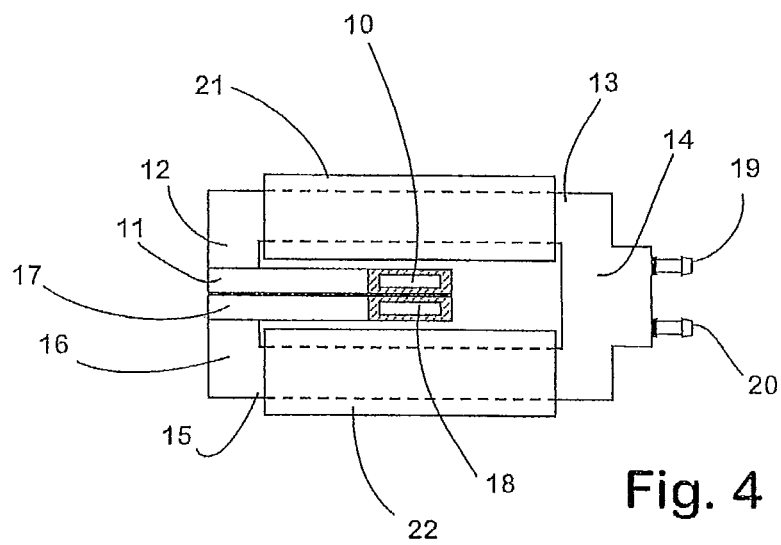
FIG. 4 shows the energy supply part in a partially cutaway view from above.

The energy supply part 5 comprises a conductor 8, made of a hollow copper tube which is rectangular in cross section, which is firmly connected by means of a terminal section 9 to the energy supply 3. The conductor has a first vertical section 10 starting from the terminal section 9 and extending downwards, a subsequent first horizontal section 11 orientated at a right angle to the first vertical section 10 in the horizontal direction, a second horizontal section 12 following the first horizontal section 11 at a right angle and also orientated horizontally, a third horizontal section 13 likewise following the latter at a right angle and extending in the same horizontal plane as it, the length of which is greater than the length of the second horizontal section 12, a fourth horizontal section 14 extending parallel to the second horizontal section 12 and orientated in the same plane as it, the length of which corresponds to twice the length of the second horizontal section 12 plus a small margin, a fifth horizontal section 15 connected to the fourth horizontal section 14 and extending parallel to the third horizontal section 13 in the same horizontal plane, a sixth horizontal section 16 connected to the fifth horizontal section 15, converging with the second horizontal section 12 and having the same length as it, a seventh horizontal section 17 connected to the sixth horizontal section 16, orientated parallel to the first horizontal section 11 and extending in the same plane as it, and a second vertical section 18 connected thereto, extending parallel to the first vertical section 10 and leading back to the terminal section 9. The heating conductor 8 of the energy supply part 5 therefore has a shoe-like shape which is rectangular in plan view (FIG. 4).

In the region of the fourth horizontal section 14 of the heating conductor 8, terminals 19, 20 are provided for a cooling water feed and discharge, via which the heating conductor 8 is connected to the coolant supply 4.

Soft magnetic cores or magnetic steel plates 21, 22 of a transmission unit U are placed on the long horizontal sections 13, 15 of the energy supply part 5. The cores 21, 22 extend over the entire length of the respective horizontal section 13, 15.

The working parts 6, 7 are mirror-symmetric, but otherwise constructed identically.

They have a heating conductor 23 likewise formed from a hollow copper tube with a rectangular cross section, which has a long first horizontal section 24, on one narrow side of which a terminal 32a connected to the coolant supply 4 is arranged for a cooling water feed, a first vertical section 25 adjacent to the other narrow side of the horizontal section 24 and leading down from the horizontal section 24 while being bent at a right angle in an S-shape, a heating conductor branch 26 connected to the vertical section 25, extending in the shape of a circle arc in the circumferential direction of the bearing surface F to be hardened and engaging at an angle of about 90°, a horizontal section 27 connected to the heating conductor branch 26, extending axially parallel to the longitudinal axis L of the crankshaft K over about half the width of the bearing surface F, as measured in the longitudinal direction L, a second arc-shaped heating conductor branch 28 connected to the horizontal section 27, extending in the circumferential direction of the bearing surface F and parallel to the first heating conductor branch 26, a second horizontal section 29 connected to the heating conductor branch 28, extending parallel to the horizontal section 27 and converging with the first heating conductor branch 26, and a second vertical section 30 connected to the horizontal section 29 and extending parallel to the first vertical section 25, which in turn connects at one of its narrow sides to a long horizontal section 31 extending parallel to the first horizontal section 24. On the other narrow side of this horizontal section 31, a terminal 32b is arranged via which the coolant flowing through the heating conductor 23 flows back to the coolant supply 4.

Owing to their mirror-symmetric shape, the conductor branches 26, 28 of the working parts 6, 7 together respectively enclose the respective upper-lying half of the bearing surface F of the pin Z (FIG. 5).

On their upwardly arranged long horizontal sections 24, 31 converging parallel with one another, the working parts 6, 7 respectively carry cores 33, 34.

The working part 6 is arranged with its core 33 at a small distance below the energy supply part 5, so that its core 33 extends axially parallel to and immediately below the core 21 of the energy supply part 5.

Likewise, the working part 7 is arranged with its core 34 at a small distance below the energy supply part 5, so that its core 34 extends axially parallel to and immediately below the core 22 of the energy supply part 5. The cores 21, 22 and the conductors 12, 15 of the energy supply part 5 thus form, together with the cores 33, 34 and the conductors 24 of the working parts 6, 7, the transmission unit U through which the electrical energy required for heating the bearing surface F is transmitted contactlessly to the working parts 6, 7 from the energy supply part 5 firmly connected to the energy supply 3.

Figure 2:
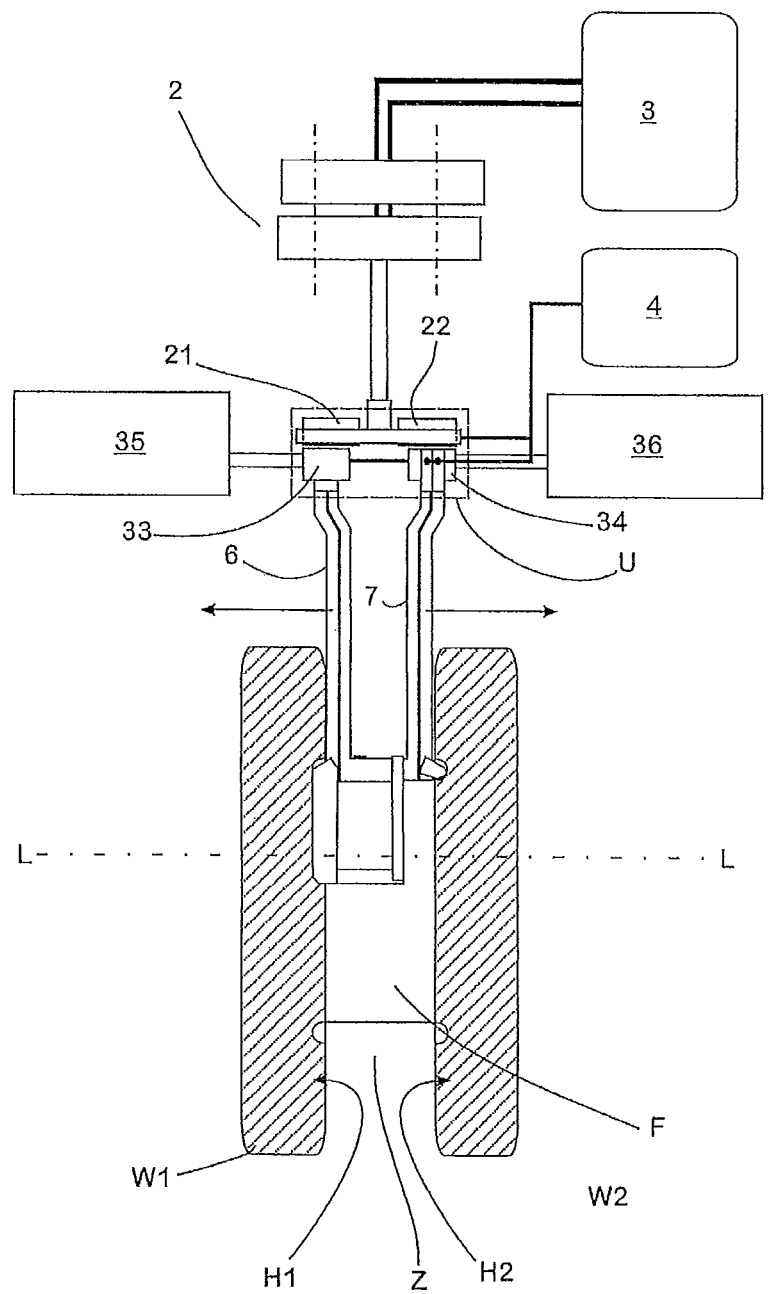
FIG. 2 shows the device according to FIG. 1 with the inductor lying in the working position.
Figure 3:
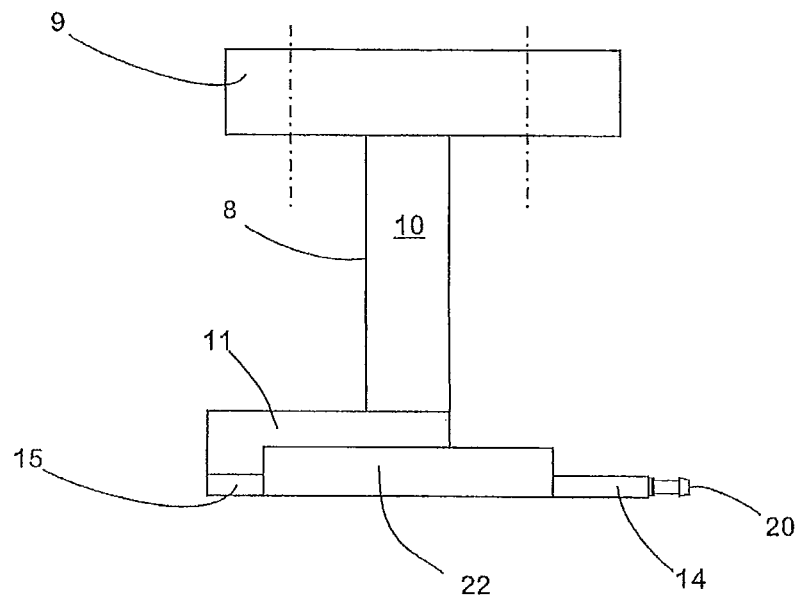
FIG. 3 shows the energy supply part of an inductor for hardening the running surface of a pin of a crankshaft in side view.

By means of control instruments 35, 36, the working parts 6, 7 can be moved from a normal position, in which they are in a position as close as possible together (FIG. 1) so that the width occupied together by the working parts 6, 7, as measured in the direction of the longitudinal axis L, is less than the internal width of the space laterally bounded by the faces W1, W2, into a working position pressed away from one another in the longitudinal direction L, in which they engage with their heating conductor branches 26 into the respectively assigned undercut H1, H2 (FIG. 2). The width measured in the direction of the longitudinal axis L, and the arrangement of the cores 21, 22; 33, 34, are in this case adapted to one another so that the cores 33, 34 still lie within the width covered by the cores 33, 34 of the energy supply part 5 when the working parts 6, 7 are in the position pressed away from one another, so that even in this position the inductively performed transmission of the electrical energy can be carried out with low losses.

In order to harden the bearing surface F, the inductor 2 with its working parts 6, 7 lying in the normal position is forwarded onto the bearing surface F, until the heating branches 26, 28 of the working parts 6, 7 rest on the bearing surface F. The working parts 6, 7 are subsequently moved away from one another in the direction of the longitudinal axis L, until their heating conductor branches 26 engage in the undercut H1, H2 assigned to them. The hardening treatment is then carried out in a manner known per se. As soon as this has been completed, the working parts 6, 7 are moved by the control instruments 35, 36 back into the normal position and the inductor 2 is moved forward from the now hardened bearing surface F in the vertical direction V, until the crankshaft K can be removed from the clamp (not shown here) without the risk of collision or the inductor 2 can be moved unimpeded to the next bearing surface F to be hardened.

LIST OF REFERENCES

1 device for inductive heating and hardening of the bearing surface F of the crankpin Z
2 inductor
3 energy supply
4 coolant supply
5 energy supply part of the inductor 2
6, 7 working parts of the inductor 2
8 conductor of the energy supply part 5
9 terminal section of the energy supply part 8
10, 18 vertical sections of the conductor 8
11-17 horizontal sections of the conductor 8
19, 20 terminals of the conductor 8 for a cooling water feed and discharge
21, 22 cores of the transmission unit U
23 respective heating conductor of the working parts 6,7
24, 27, 29 horizontal sections of the heating conductor 23
25, 30 vertical sections of the heating conductor 23
32a, 32b terminals for a cooling water feed and discharge of the heating conductor 23
26 first curved heating conductor branch of the heating conductor 8
28 second curved heating conductor branch of the heating conductor 23
33 cores of the working part 6
34 cores of the working part 7
35, 36 control instruments
F bearing surface
H1, H2 undercuts
K crankshaft
L longitudinal axis of the crankshaft K
T dividing plane of the inductor 2
U transmission unit
V vertical direction
W1, W2 crankfaces
Z crankpin

The invention claimed is:

1. A device for hardening the surface of a cylindrical section of a workpiece, in which an undercut incised into the workpiece in an axial direction of the workpiece is formed in a transition region between the cylindrical section and an adjacent workpiece part, the device comprising an inductor which comprises a heating conductor branch extending in the circumferential direction of the surface to be hardened for inductive heating of the relevant section, a control instrument for pressing the heating conductor branch of the inductor into the undercut and an energy supply, which supplies the inductor with electrical energy during operation, wherein, the inductor is divided into an energy supply part which is connected to the energy supply, and first and second working parts which comprise the heating conductor branch, wherein the first working part is assigned to a first undercut provided on a first edge of the surface to be hardened and the second working part is assigned to a second undercut provided on the opposite edge from the first edge of the surface to be hardened, wherein the energy supply part and the first and second working parts each include a magnetic core, wherein the magnetic cores of the first and second working parts are at a small distance from the magnetic core of the energy supply part such that electrical energy is transmitted contactlessly from the energy supply part of the inductor to the working parts of the inductor, and wherein each working part is coupled to the control instrument which displaces the magnetic core of the first working part relative to that of the energy supply part to thereby displace the first working part relative to the surface to be hardened and relative to the energy supply part in order to press the heating conductor branch into the first undercut, wherein the control instrument displaces the magnetic core of the second working part relative to the magnetic core of the energy supply part to thereby displace the second working part relative to the surface to be hardened and relative to the energy supply part in order to press the heating conductor branch into the second undercut.

2. The device according to claim 1, wherein a dividing plane between the working parts and the energy supply part is orientated parallel to a longitudinal axis of the workpiece.

3. The device according to claim 1, wherein a dividing plane between the working parts and the energy supply part is orientated transversely to a longitudinal axis of the workpiece.

4. A method for hardening a bearing position of a shaft, in which an undercut orientated in an axial direction of the shaft is formed at a transition between the bearing position and an adjacent shaft section, the method comprising:

providing an inductor which comprises a heating conductor branch;

extending the heating conductor branch in the circumferential direction of the surface to be hardened for inductive heating of the relevant section;

pressing, using a control instrument, the heating conductor branch of the inductor into the undercut; and supplying the inductor with electrical energy during operation from an energy supply;

wherein, the inductor is divided into an energy supply part which is connected to the energy supply, and first and second working parts which comprise the heating conductor branch, wherein the first working part is assigned to a first undercut provided on a first edge of the surface to be hardened and the second working part is assigned to a second undercut provided on the opposite edge from the first edge of the surface to be hardened, wherein the energy supply part and the first and second working parts each include a magnetic core, wherein the magnetic cores of the first and second working parts are at a small distance from the magnetic core of the energy supply part such that electrical energy is transmitted contactlessly from the energy supply part of the inductor to the working parts of the inductor, and wherein each working part is coupled to the control instrument which displaces the magnetic core of the first working part relative to that of the energy supply part to thereby displace the first working part relative to the surface to be hardened and relative to the energy supply part in order to press the heating conductor branch into the first undercut, wherein the control instrument displaces the magnetic core of the second working part relative to the magnetic core of the energy supply part to thereby displace the second working part relative to the surface to be hardened and relative to the energy supply part in order to press the heating conductor branch into the second undercut.

5. The method according to claim 4, wherein the shaft is a crankshaft for a combustion engine.

6. The method according to claim 5, wherein the first and second undercuts are respectively formed on both edges of the bearing position at the transition to the respectively neighbouring shaft section.

7. The method according to claim 4, wherein the first and second undercuts are respectively formed on both edges of the bearing position at the transition to the respectively neighbouring shaft section.

* * * * *